April 21, 1970

K. J. NOKLEBY 3,507,335

FIELD PREPARATION MACHINE

Filed Jan. 23, 1967

INVENTOR.
KERMIT J. NOKLEBY,
DECEASED,
BY GLADYS NOKLEBY, LEGAL REPRESENTATIVE.
BY
Williamson, Palmatier
& Bains ATTORNEYS April 21, 1970
K. J. NOKLEBY
3,507,335
FIELD PREPARATION MACHINE
Filed Jan. 23, 1967
3 Sheets-Sheet 3
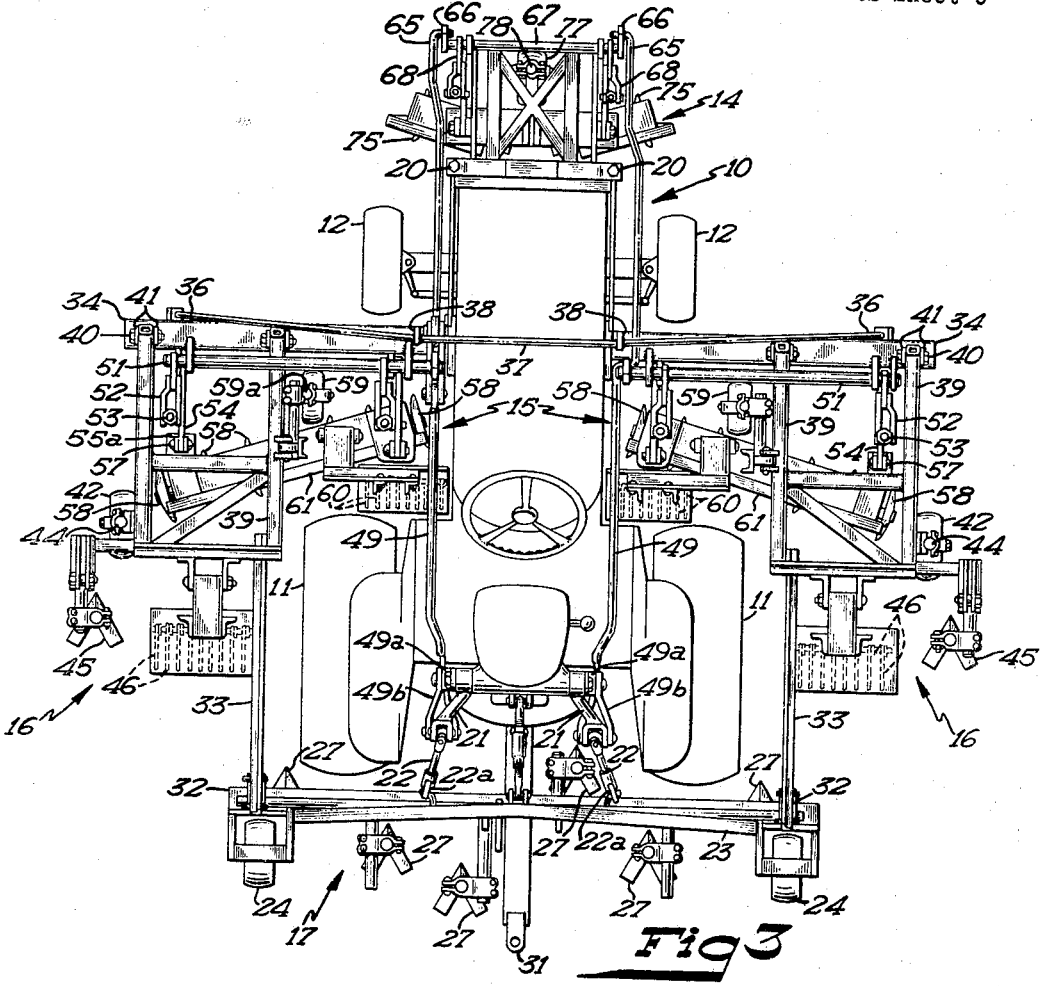
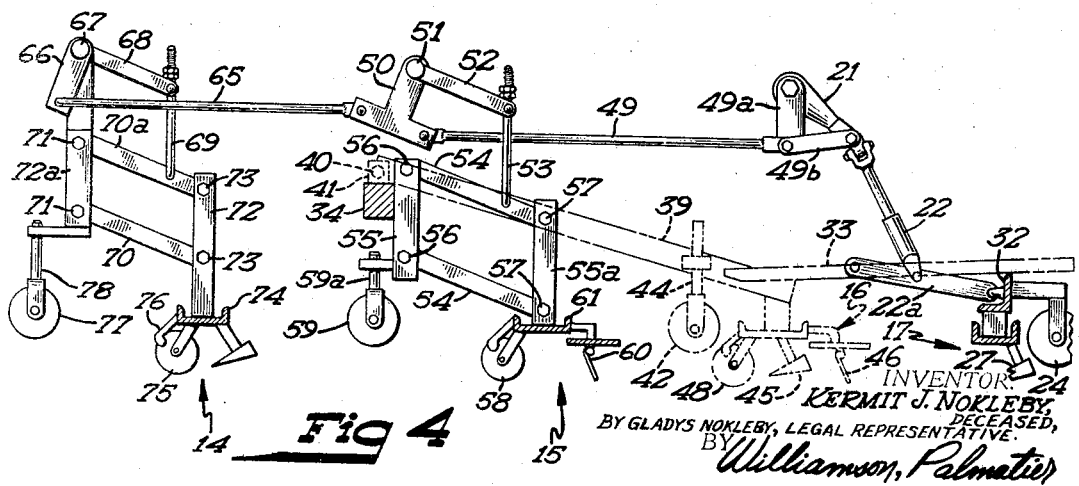
INVENTOR
KERMIT J. NOKLEBY,
DECEASED,
BY GLADYS NOKLEBY, LEGAL REPRESENTATIVE.
BY
Williamson, Palmatier
& Bains
ATTORNEYS

United States Patent Office 3,507,335
Patented Apr. 21, 1970

3,507,335
FIELD PREPARATION MACHINE
Kermit J. Nokleby, deceased, late of Montevideo, Minn., by Gladys Nokleby, legal representative, 515 N. 10th St., Montevideo, Minn. 56265
Filed Jan. 23, 1967, Ser. No. 612,071
Int. Cl. A01b 59/044
U.S. Cl. 172—300
8 Claims

ABSTRACT OF THE DISCLOSURE

An agricultural machine adapted to disc, harrow and drag a field in one step to completely prepare the field for planting, the machine having front tools, forward intermediate tools, rearward intermediate tools, and rear tools engageable with the ground and adapted to be simultaneously lowered in one operation by a single hydraulic system to a predetermined ground depth and simultaneously raised as desired.

---

This invention relates to an agrictultural machine adapted to prepare fields for planting and, more particularly, relates to an agricultural machine adapted to carry out the operations of discing, harrowing and dragging a field in one step thereby completely preparing the field for planting.

Oftentimes when cultivating a field in preparation for planting, rain may destroy the first step done in the field in the overall cultivating operation. Therefore, before the farmer may continue with the cultivating operation, he must redo the step which had been performed prior to the rain. This, of course, results in a great deal of extra time expended in preparing a field for planting.

Many devices have been developed to allow a farmer to cultivate a field in a single operation. In fact, devices have been developed which not only prepare the soil for planting but pull a planter behind the apparatus and fertilize and otherwise treat the soil at the time of planting. However, machines capable of preparing a field for planting and doing other steps have heretofore lacked versatility and have been too cumbersome to operate. Further, presently available machines require a myriad of adjustments and therefore constant attention and a great deal of time, labor and expense in the use of the combination machines.

With these comments in mind it is to the elimination of these and other disadvantages to which the present invention is directed, along with the inclusion of other novel and desirable features.

An object of the invention is to provide a new and improved field preparation machine of simple and inexpensive construction and operation.

Another object of the invention is to provide a novel field preparation machine which uses a minimum of controls and accurately prepares the soil for planting with a minimum of attention and skill on the part of the operator.

Still another object of the invention is the provision of an improved and novel field preparation machine which is versatile in that it is adapted to be readily attached to a tractor yet may be readily detached for alternate usage of the tractor.

A further object of the invention is the provision of a machine which performs the operations of discing, harrowing and dragging a field as well as being capable of towing a planter for planting in the same operation, yet which machine enjoys a high degree of maneuverability in the field.

A still further object of the invention is the provision of an improved field preparation machine which is simple and in its assembly to a tractor and simple in its removal from the towing vehicle and will therefore permit quick and easy assembly or disassembly by a person of minimum skill or manual dexterity.

These and other objects and advantages of the invention will more fully appear from the following description made in connection with the accompanying drawings wherein like references characters refer to the same or similar parts throughout the several views, and in which:

FIG. 3 is a plan view of the invention; and

FIG. 4 is an enlarged schematic side view of a portion of the linkage assembly of the field preparation machine of the invention.

Figure 1:
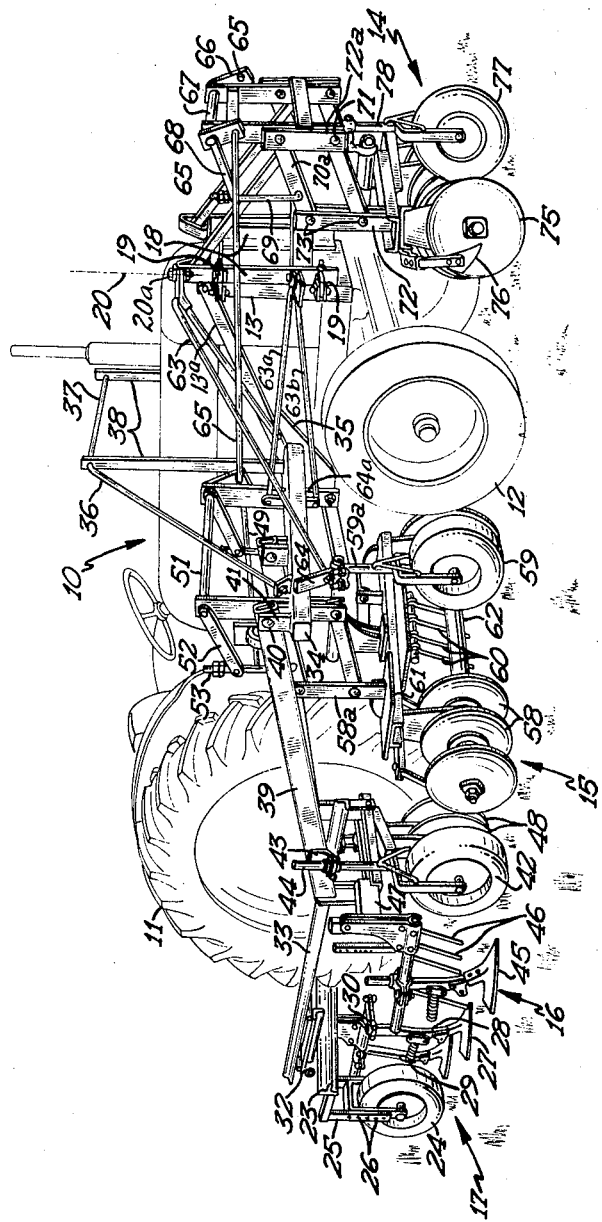
FIG. 1 is a perspective view of the field preparation machine of the invention.
Figure 2:
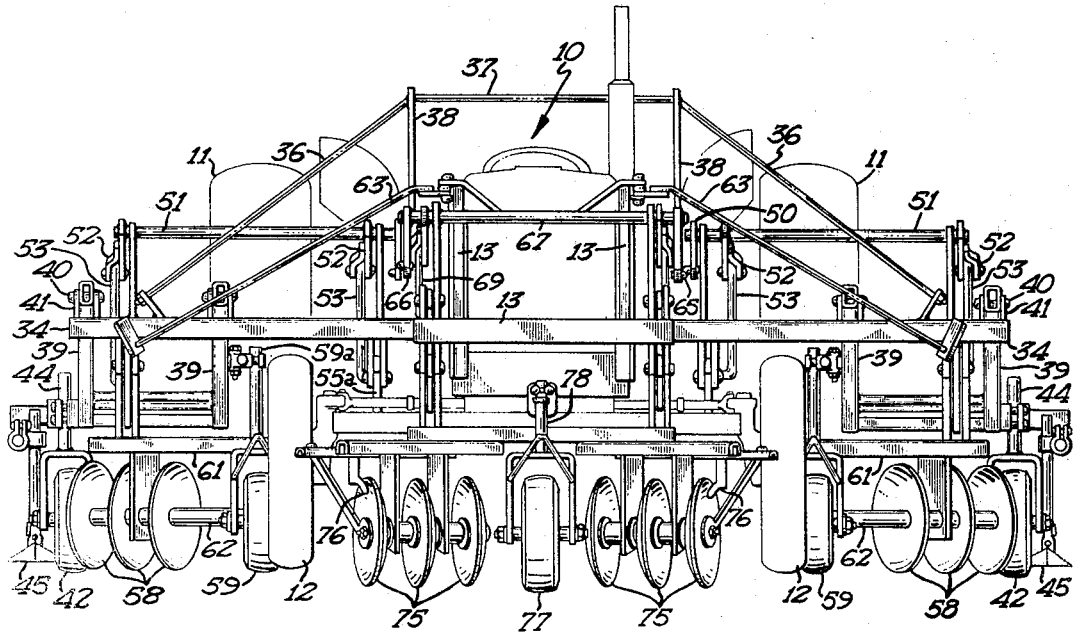
FIG. 2 is a front view of the field preparation machine.

One form of the present invention is shown in the drawings and is described herein. The invention is described in the terms of a tractor, denoted by the numeral 10 with the tilling or cultivating tools attached thereto. Of course, the tools may be attached to any of several types of tractors and it is not intended to limit the invention to the type of tractor or towing vehicle described herein. Since the tractor 10 is utilized in several applications it is important that the tools be assembled to the tractor with a minimum of difficulty. To this end, there is provided a structure adapted to be attached to a tractor and be driven and controlled from the tractor. For ease of installation, it is important that the tractor have an hydraulic lift mechanism to which the apparatus may be attached. Tractor 10 is a standard, commercially available unit such as a Fordson Major tractor and has rear wheels 11 and front wheels 12 which are not affected by the tools which are mounted on the tractor.

The apparatus of the invention comprises, in combination, tractor 10 and the series of cultivating tools which are attached thereto. In general, the tools are attached to the tractor 10 in such a way that the discs, harrows and drags may be raised or lowered simultaneously as desired by the operator. Further, a series of depth control wheels may be adjustably set in the vertical dimension to determine the depth of the setting on the discs. The discs are set in the manner of a tandem disc assembly with selected discs forcing dirt inwardly and other selected discs forcing dirt outwardly. Further, the discs are so arranged that the cultivated earth is not further compacted by wheels 11 and 12 of the tractor 10 as the tractor proceeds over the ground being cultivated. The tools are hydraulically operated and the controls are connected to the tractor in such a way that a single control on the tractor actuates all of the tools urging them downwardly into the ground after the cultivating has been completed or for turning or other maneuvers in the field. The tools are lifted by the mechanical linkages which are operably connected to the controls, and are lifted simultaneously thereby preventing any undue stress on any particular portions of the tools, linkages or tractor driving mechanisms.

Referring now to FIG. 1, a stool receiving or mounting frame 13, constructed of rigid structural steel, is securely affixed to the tractor 10. The frame extends from the forward portion of the tractor rearwardly to the approximate midpoint and is securely affixed to the tractor frame to permit rigid attachment of the front tools, the intermediate forward tools and the intermediate rearward tools. Frame 13 cradles the tractor 10 and may be considered as a permanent atachment to tractor 10 in that frame 13 is not removed when the front intermediate and rearward intermediate tools are removed from the tractor. The front tools are indicated by the numeral 14, the forward intermediate tools are indicated by the numeral 15 and the rearward intermediate tools are indicated at numeral 16. The rearward tools are indicated by the numeral 17. Since the design is symmetrical only one side will be discussed. A detachable frame member 18 is shown swingably attached to the frame 13 by bolts 19. Frame 13 cradles the tractor housing and frame 18 substantially mates with the forward portion of frame 13 on each side of the housing and forms a yoke or saddle attachment which allows the forward and rearward intermediate sections to swing outwardly of tractor 10 about an upright axis denoted by the numeral 20.

The rear tools 17 are connected to the hydraulic mechanism of the tractor 10. As best shown in FIG. 3, a pair of hydraulic lift arms 21 are shown as standard equipment on tractor 10 and are driven from the tractor hydraulic system in response to controls mounted adjacent to the tractor operator. Linkage arms 22 and 22a join the hydraulically operated arms 21 to a transverse rear frame member 23 on which the tools for cultivating are mounted. Since the operation of the front tools and the forward and rearward intermediate tools are dependent upon the operation of the rear tools, description of the apparatus of the invention will proceed from the driving to the driven linkages for the manipulation of the tools.

Rear depth gage wheels 24 are shown attached to the rear transverse frame member 23 and, as shown in FIG. 1, are adjustably attached in the vertical dimension at wheel mounting frame 25 which includes apertures 26 to provide for the vertical adjustment of wheels 24. A plurality of duck foot cultivators 27 are attached through arms 28 to the rear transverse frame member 23. The duck foot cultivators are spring loaded at 29, as is conventional to prevent damage to the cultivator blade. Additionally the cultivator blades are vertically adjustable along arms 28 at brackets 30. Any suitable number of duck foot cultivators may be utilized and the depth of the rear cultivators may be determined by the setting on gage wheels 24 in combination with the setting along arms 28 at brackets 30. Suitable rigid steel bracing structure is included as necessary to support the transverse rear frame member 23 and is not shown here. As shown in FIG. 3, the cultivator blades 27 are positioned rearwardly of wheels 11 to prevent compaction of the ground on which the wheels 11 must travel. Also shown in FIG. 3 is the drawbar 31 which may be utilized to pull a planter to conveniently plant in the same operation.

Referring back to FIG. 1, the rearward intermediate tool actuating plate 32 is shown attached to rear transverse frame member 23 as by welding. Intermediate tool actuating plate 32 receives a cooperating lever arm 33 which is operably connected to the rearward intermediate tool assembly. The rearward intermediate tool assembly lever arm 33 is actuated in response to plate 32 in that upward movement of the transverse rear frame member 23 causes the actuating plate 32 to rise and, since lever arm 33 is slidably resting thereon, actuating plate 32 cams the lever arm 33 upwardly.

The rearward intermediate cultivating tools are attached to the tractor frame 13 through transverse intermediate tool supporting member 34 which is rigidly connected to frame 13 at plate 35 which is securely bolted to the frame of the tractor. Member 34 projects outwardly a suitable distance past wheel 11 and is constructed from a rigid steel framework as, for example, rectangular steel tubing. Suitable supporting framework 36 and cross frame 37 which is attached to upright supporting structure 38 supports the generally horizontal outwardly and transversely extending intermediate support member 34. A rearward intermediate supporting arm 39 is pivotally attached to member 34 at pivot point 40 which is essentially a bolt assembly through bracket 41 which is attached to support member 34 as by welding. Rearward supporting arm 39 is adapted to pivot about an axis which is generally transverse to the direction of travel of the tractor and substantially horizontal relative to the ground. Lever arm 33 which slides on actuating plate 32, is attached to supporting arm 39 as by welding thereby raising arm 39 at such times as the transverse rear frame member is raised by the hydraulic system on the tractor.

Rearward intermediate gage wheels 42 are attached to arm 39 and are adjustable in the vertical direction at bracket 43 which is attached to arm 39 as by welding and through which shaft 44 which supports wheel 42 passes. Additional duck foot cultivators 45 are attached in the manner of the attachment of duck foot cultivator 24 to the transverse frame member 23. Additionally, drag tines 46 are attached to the vertically adjustable tine receiving bracket 47 which in turn is attached to arm 39 as by welding. A plurality of discs 48 are also attached to arm 39 and are adjustable in the vertical dimension to correspond to the adjustment of the cultivator blades and the drag tines.

The forward intermediate tools are also mounted on support member 34 for vertical movement in response to hydraulic actuating means on tractor 10. However, it should be noted that the forward intermediate cultivator tools are not actuated in response to lever arm 33, but are actuated directly from the hydraulic apparatus of tractor 10 through forward intermediate linkage arm which is indicated at 49. The variation on the actuating mechanism from the rearward intermediate tools to the forward intermediate tools provides distribution of the stresses on the linkage members and, distributes the load on the hydraulic system of tractor 10.

Referring to the schematic diagram of FIG. 4, linkage arm 49 is shown attached to hydraulic arm 21 through links 49a and 49b which properly join the actuating link 49 to the hydraulic system on the tractor through hydraulic driving arm 21. A forward intermediate pivot arm 50 is pivotally attached to the tractor for rotation about pivot 51 which provides for rotation about a generally horizontal axis which is transverse in direction of travel of the tractor. Pivot arm 50 is T-shaped and includes an actuating arm 52 for pivotal movement about pivot 51 and which is affixed to the forward intermediate arm 51 as by welding. Arm 52 extends generally rearwardly and is adjustably attached to upright arm 53 which in turn is attached to a linkage assembly made up of parallel elements 54 and upright forward link 55 and rearward upright link 55a which is parallel with link 55. The linkage assembly is pivotally attached to transverse intermediate tool supporting member 34 along link 55. The links are pivotally attached to form a parallel structure with stationary pivot points 56 and floating pivot points 57. Link 55a moves upwardly or downwardly about an axis which is generally horizontal and transverse to the direction of travel of the tractor. The parallel structure of the linkage assembly gives structural strength to support the tools which engage the ground. The links are typically constructed of rigid steel members of suitable size. The rearward intermediate tools are indicated at 15 as schematically attached to the rear parallel link 55a.

FIG. 4 also shows lever arm 39 which supports the rearward intermediate tools 16. The lever arm 39 is shown in dotted lines pivoted at pivot point 40 with the bracket 41 attached to the transverse member 34. Also shown is lever arm 33 which is welded to the rear lifting arm 39 and which is cammed by the upward movement of rearward intermediate tool actuating plate 32 which, through link 22 and link 22a raises the plate 32 upwardly or lowers it in response to actuation of the hydraulic arm 21 by the operator of the tractor.

Referring to FIG. 1, the forward intermediate tools include a plurality of discs 58 the depth of which is controlled by forward intermediate depth control wheels 59 mounted on vertically adjustable shaft 59a. Drag tines 60 are shown and are mounted on tool supporting frame element 61 which in turn is attached to upright link 55a which is manipulated by the operator in the manner described above. Other suitable supporting structural members are shown in FIG. 1 to provide appropriate strength to the framework which supports the tools and which is raised and lowered in response to the hydraulic controls on the tractor 10. It should be noted that discs 58 are rotatably mounted on shaft 62 for rotation about a horizontal aixs which is generally transverse to the direction of travel of the tractor. Discs 58 may be arranged to throw dirt inwardly or outwardly as desired with the corresponding discs on the other side of the tractor arranged to work with discs 58 as desired. Additional bracing members 63, 63a and 63b join the support member 34 through brackets 64, 64a which are welded onto the member 34 for added strength. Bracing members or rods 63, 63a and 63b are attached to detachable frame member 18 by vertically aligned bolts 20a which define vertical axis 20. Support rods 63, 63a and 63b provide for strength not only during the cultivating operation but at such times as the rearward and forward sections are swung about axis 20 away from the tractor. Other suitable bracing structure is shown but is not described herein.

The front cultivator tools are actuated as best shown in FIG. 4. T-shaped arm 50 which is actuated from the hydraulic assembly on tractor 10 through forward intermediate actuating arm 49 is connected to front connecting arm 65 upon actuation of member 50 about pivot 51. Connecting arm 65 moves forwardly or rearwardly as desired. Front connecting arm 65 is pivotally attached to lever arm 66 which in turn is pivoted at pivot 67 which is provided from a rigid mounting on tractor 10 to provide rotation about a generally horizontal axis transverse to the direction of travel. Lifting lever arm 68 is welded to arm 66 and, as the actuating arm 65 is moved rearwardly, arm 66 pivots about point 67 thereby raising link 68 which is connected to rod 69. Rod 69 is adjustably attached to lifting arm 68 and actuates a forward linkage assembly which forms a parallelogram having lower link 70 and upper link 70a which are opposed and pivotally attached to opposed parallel upright lines 72 and 72a at forward pivots 71 and rearward pivots 73. Link 72a is stationary and link 72 is an upright floating link having a transverse tool mounting plate 74 attached thereon as by welding or bolting. The front cultivating tools are attached to the tool mounting plate 74 and are indicated by numeral 14.

Referring to FIG. 1, the forward tools include a disc assembly which is manipulated upwardly and downwardly in response to the hydraulic controls through the forward linkage structure described in FIG. 4. Upper link 70a is attached to rod 69 and moves in response to T-shaped member 50. The discs are indicated at 75 and include a clean-off blade 76. Front depth control wheel 77 is also shown and is adjustable at shaft 78 on the front framework of the link 72a. The field preparation machine of the invention is operated, after its attachment to a tractor, by traversing the field to be prepared for planting with the rearward intermediate, forward intermediate and the forward field preparation tools in the lowered position. The depth control wheels corresponding to the appropriate field preparation tools are set to determine the depth to which the tools are to be lowered. Further, the depth control wheels give added stability and bearing support to the unit thereby permitting the attachment of the field preparation machine to the tractor and distributing the weight from the attachment rather than concentrating the weight at the tractor wheels.

The field preparation machine is attached to the tractor by first mounting the frame 13 thereon which receives the swingably mounted, intermediate tool supporting members 34. Frame member 18, with tool supporting members 34 suspended therefrom by means of support rods 63, 63a and 63b, is secured to frame 13, by means of eye bolts 19; and support rods or bar 63, 63a and 63b are pivoted outwardly about vertical axis 20 in order to swing transverse support members 34 into the transversely extending field use position shown most clearly in FIGURE 3. Both the forward intermediate and the rearward intermediate field preparation tools 15 and 16 respectively depend from and are affixed to the intermediate tool supporting members 34 and, consequently, simultaneously swing outwardly about the forward pivot axis 20 as desired. Intermediate tool support members 34 are secured in place by bolting plates 35 at the inner end thereof to rearwardly extending brace 13a of the stationary tractor frame 13. This arrangement allows the tractor operator to readily mount or remove the field preparation machine from the tractor.

In traversing the field to be prepared for planting, a seed planter may be towed by the tractor, thereby completing preparation and seeding in one operation or step. This decrease in the time in carrying out preparing and seeding in view of the changeable weather during planting season, may save the farmer great inconvenience and save considerable money if a storm occurs between conducting the various steps with conventional equipment.

Hydraulic controls on the tractor allow the tractor operator to manipulate the rear transverse frame member which simultaneously actuates the rear tools which are raised or lowered from the ground simultaneously with the rearward intermediate tools. Further, the hydraulic arm on the tractor which manipulates the rear transverse frame member is operably connected to the forward intermediate tools and the forward tools which are also raised or lowered simultaneously with raising or lowering of the rear intermediate tools and the rear tools. Of course, any combinations of cultivators, discs or tines may be utilized for the field preparation tools as well as any other special purpose tools.

From the foregoing it will be seen that there is provided a field preparation machine which allows an operator to completely prepare a field for planting in one operation thereby permitting a farmer to completely prepare a field for planting and plant with a towed planter in one operation. In that during field preparation and planting time the weather is typically unsettled, it is particularly important and oftentimes economically advantageous for a farmer to complete this operation as quickly as possible. There is provided a field preparation machine which is quickly and easily attached or removed from a tractor and which will accomplish in one fast, complete operation the preparation of the field and seeding of the field. There is also provided depth control wheels which also serve to distribute the load about the tractor and which assure the depth of the field preparation tools mounted on the tractor thereby resulting in uniformity in preparing of the field for planting. Also provided is a machine which utilizes simple and easily maintained mechanical linkages to tie the front, forward intermediate, rearward intermediate, and rear tools together for simultaneous operation from the operator's platform.

It will, of course, be understood that various changes may be made in the form, details, arrangement and proportions of the various parts without departing from the scope of the invention.

What is claimed is:

1. In combination with a tractor having front and rear wheels and an hydraulically operated arm responsive to hydraulic controls on the tractor,
   a field preparation machine adapted to prepare a field for planting, said machine comprising,
   a rear transverse frame member operably connected to the hydraulically operated arm on the tractor whereby actuation of the hydraulic controls on the tractor interchangeably raises and lowers said transverse frame member,
   rear field preparation tools affixed to said rear transverse frame member, said rear field peparation tools positioned to engage the ground in the lowered position of said rear transverse member and positioned free of the ground in the raised position,
   at least one depth control wheel mounted on said rear transverse frame member for vertical adjustment whereby the depth of said rear field preparation tools in the lowered position of said rear transverse frame member relative to the ground may be set at a predetermined depth, intermediate tool supporting members projecting outwardly from the tractor on each side thereof substantially transverse to the direction of travel of the tractor, means detachably mounting said intermediate tool supporting members on the tractor, rearward intermediate lifting arms pivotally mounted on said transverse intermediate tool supporting members at the outer ends thereof, said rearward lifting arms mounted for pivotal movement about an axis substantially horizontal and transverse to the direction of travel of the tractor, lever arms affixed to said rear lifting arms and extending rearwardly therefrom, said lever arms positioned in slidable contact with said rear transverse frame member whereby actuation of said rear transverse frame member is transmitted to said rearward intermediate lifting arms whereby said lifting arms are interchangeable raised and lowered simultaneous with said rear transverse frame member, rearward intermediate field preparation tools mounted on said rearward intermediate lifting arms, said tools positioned to engage the ground in the lowered position of said rear transverse frame member and positioned free of the ground in the raised position and, at least one depth control wheel adjustably mounted on each of said rearward intermediate lifting arms whereby the depth of said rearward intermediate field preparation tools mounted thereon may be controlled in the lowered position of said rear transverse frame member.

2. The apparatus of claim 1 including a forward intermediate tool linkage assembly affixed on each side of the tractor on said intermediate tool supporting members, forward intermediate field preparation tools affixed on said forward intermediate tool linkage assemblies, said forward intermediate linkage assemblies operably connected to the hydraulically operated arm on the tractor whereby actuation of the hydraulic controls on the tractor interchangeably raises and lowers said intermediate linkage assemblies positioning said forward intermediate tools affixed thereon in ground engaging relation in the lowered position of the said forward linkage and, in the raised position, positioning said forward intermediate tools free of the ground, said forward intermediate tools raised and lowered simultaneous with said rearward intermediate tools and with said rear tools and including at least one depth control wheel mounted on each of said forward intermediate linkage assemblies to permit depth control of said forward intermediate field preparation tools in ground engaging relation.

3. The apparatus of claim 2 wherein said forward intermediate field preparation tools include cultivators, discs, and tines positioned to prepare a field for planting and to compensate for compaction on the ground by the tractor wheels.

4. The apparatus of claim 1 including a forward linkage assembly, operably attached to the hydraulically operated arm on the tractor whereby actuation of the hydraulic controls on the tractor interchangeably raise and lower said forward linkage, forward field preparation tools attached to said forward linkage assembly to permit interchangeably raising and lowering said forward field preparation tools to be positioned in ground engaging relation in the lowered positioned of said forward linkage assembly and in the raised position of said forward linkage assembly, to be positioned free of the ground, said front field preparation tools raised and lowered simultaneously with the raising and lowering of said rear field preparation tools.

5. The apparatus of claim 4 wherein said forward field preparation tools include cultivators, discs and tines positioned to prepare a field for planting and to compensate for compaction on the ground by the tractor wheels.

6. The apparatus of claim 1 wherein said rear field preparation tools include a plurality of cultivators, discs and tines positioned in predetermined relation relative to the wheels of the tractor whereby the ground acted upon by the tractor and said field preparation tools is compensated for compaction of the ground by the action of the tractor wheels on the ground.

7. The apparatus of claim 6 wherein said rearward intermediate tools include cultivators, discs and tines positioned to prepare a field for planting and in predetermined relation to said rear field preparation tools whereby the ground acted upon by said field preparation tools is compensated for compaction of the ground by the tractor.

8. The apparatus of claim 1 wherein said means detachably mounting said intermediate tool supporting members on the tractor comprises a mounting framework swingably mounted on the tractor whereby said intermediate tool supporting members may be released from the tractor and swung outwardly from the tractor about a substantially upright pivot axis to permit detachment of said supporting member and to permit the tractor to be backed away from said field preparation machine.

References Cited

UNITED STATES PATENTS

| | | | |
|---|---|---|---|
| 2,752,837 | 7/1956 | Parker | 172—300 X |
| 3,023,816 | 4/1962 | Tanke | 172—273 |

ROBERT E. PULFREY, Primary Examiner

R. C. HARRINGTON, Assistant Examiner

U.S. Cl. X.R.

172—295, 307